United States Patent Office 3,421,806
Patented Jan. 14, 1969

3,421,806
MICROSCOPE APPARATUS INCLUDING
PHOTOMETRIC MEANS
Klaus Weber, Nauborn, Kreis Wetzlar, Germany, assignor to Ernst Leitz G.m.b.H., Wetzlar, Germany
Filed Feb. 3, 1964, Ser. No. 342,058
Claims priority, application Germany, Feb. 8, 1963,
L 44,084
U.S. Cl. 350—19        11 Claims
Int. Cl. G02b 21/18; 23/04

ABSTRACT OF THE DISCLOSURE

A photometric attachment for use with a microscope. The attachment comprises an aperture of adjustable area which restricts the photometric measurement to light received from a predetermined portion of the object. Beam splitting means are provided for simultaneous observation of the object and the portion thereof from which light will be received for measurement, the measurement portion of the object being designated by the temporary imposition on the image thereof of an illuminated area which corresponds to the measurement area.

---

The present invention relates to microscope apparatus including a photometer for measuring light absorption characteristics of the object and which comprises an optical path for microscopic observation of an object simultaneously with a restrictive aperture located in another ray path or optical path for the measurement of illumination intensity of the object, the restrictive aperture being defined by a stop member having an aperture of adjustable area positioned at the image plane of the measurement path.

In order to confine the illumination measurement to the object under observation or to a desired specific portion thereof, it is desirable that the size of the restrictive aperture should be continuously adjustable by the operator so that the aperture may be adjusted to fit the object under observation and that a separate illumination system is provided which makes visible within the boundaries of the image of the object, the location and size of the aperture through which the measurement of object illumination is to be made.

The present invention avoids these difficulties by positioning in the image plane of the measuring ray path, a stop member providing a restrictive aperture of continuously adjustable size such as an iris diaphragm or an adjustable rectangular slit with a temporary light source positioned behind the stop member to illuminate the rear surface thereof. Additionally, optical means are included in the ray path in front of the stop member in such a manner that a temporarily illuminated image of the aperture is formed which appears at the image plane of the observation ray path. In the optical or ray path which is provided for the temporary illumination of the restrictive aperture defined by the stop member, either a displaceable opaque mirror or a semi-reflective mirror which operates as a beam splitter is advantageously provided between the stop member and the illumination measuring device.

The temporarily illuminated image of the adjustable aperture is introduced into the optical path used for observation by means of a totally reflecting surface positioned near the main beam splitter which divides the light from the microscope into separate observation and measurement beams. In another embodiment, the main beam splitter is so arranged that the totally reflective surface directs the image of the object into the observation path. This totally reflecting surface may be formed directly upon the body of the beam splitter. The configuration of this totally reflecting surface is determined by the positioning of the main beam splitter in a portion of the optical path from the microscope where the rays are parallel, convergent or divergent, as the case may be.

If a displaceable fully reflective mirror is used in connection with the illumination of the restrictive aperture, it is withdrawn from the measurement path during measurement. If a fixed semi-reflective mirror or beam splitter is used for illumination of the adjustable aperture, then the light source which furnishes illumination for the adjustable restrictive aperture is switched off during measurement. It is also possible, however, to maintain the illumination for observation of the aperture during measurement by the use of a chromatic beam splitter if the light used for measurement and the light used for illumination of the aperture are from invisible and visible portions, respectively, of the spectrum which are readily separable by the chromatic beam splitter.

Various embodiments are schematically illustrated in the accompanying drawing.

Referring to the drawing.

Figure 1:
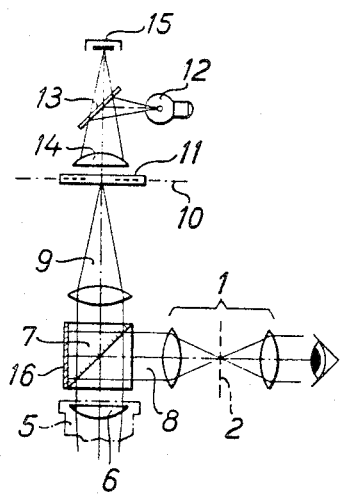
FIGURES 1 and 4 are fragmentary side elevational diagrams showing arrangements wherein the splitting into observation and measurement optical paths takes place in a parallel ray path, whereas in the arrangement according to FIGURES 2 and 3, the optical path division takes place in a convergent ray path.
Figure 2:
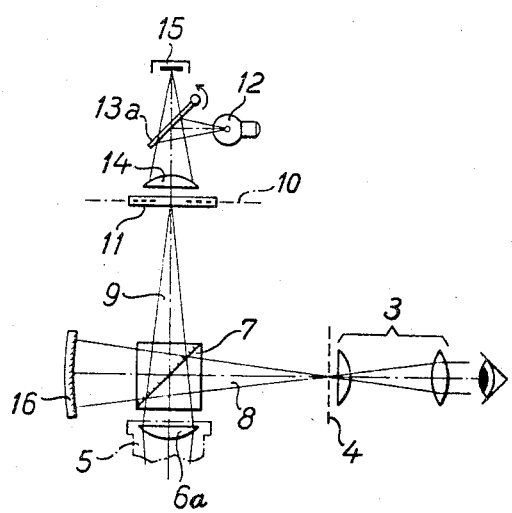
Figure 3:
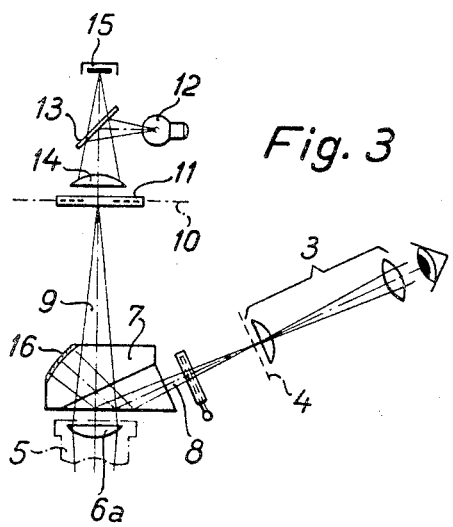
Figure 4:
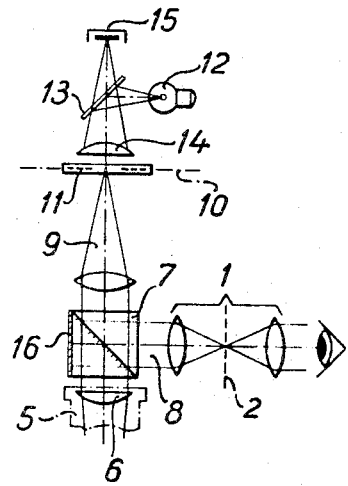

Accordingly, there is provided in the arrangements of FIGS. 1 and 4, a telescope 1 for observation which has a focal or image plane located at 2. In FIGS. 2 and 3, on the other hand, there is provided a magnifier or ocular 3 for observation in front of which the image plane 4 is located. In the four figures, like parts have been given the same reference numerals.

Above a microscope tube 5 with an ocular 6 there is disposed a main beam divider unit 7 which splits the microscope ray path into an observation path 8 and a measurement path 9. In the image or focal plane 10 of the measurement path an adjustable aperture stop 11 is arranged which is illuminated from the rear, when desired, by means of a light source 12 and a fixed semi-reflective mirror or beam divider 13 or a displaceable opaque mirror 3a (FIG. 2) and a lens 14 which operates in the measuring path as a field lens. A photometric receiver device 15 is arranged in the measurement path beyond the auxiliary or illumination beam divider 13 or mirror 13a. The photometric device 15 may include, for example, a photosensitive resistor, a secondary emission electron multiplier or other suitable photometric illumination measuring apparatus. On the main beam divider unit 7, or in proximity thereto (FIG. 2), there is arranged a fully reflective surface 16 which serves to mirror the image of the aperture stop 11 into the observation path 8 (FIGS. 1, 2 and 3) or to reflect the reflected rays of the beam divider (FIG. 4) into the observation path 8 for use with the observation apparatus (telescope 1 or the magnifier or ocular 3).

Figure 5:
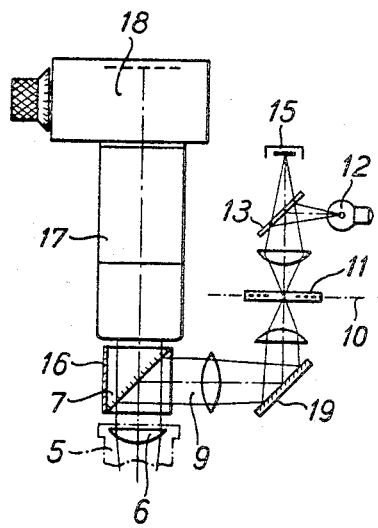
FIGURES 5 and 5a show, respectively, an arrangement with a photographic apparatus and a slide member with optical devices which selectively permit direction of the optical path to the photometer or to the photographic apparatus.
Figure 5A:
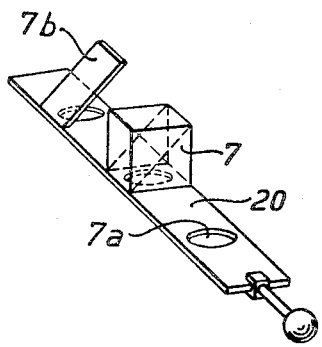

It is understood that such arrangements may be combined with photographic recording apparatus. For example, such an arrangement is shown in FIG. 5. In this case the measurement beam 9 is the reflected beam, whereas a photographic tube 17 and a camera 18 are arranged above the main beam splitter 7. It is naturally also possible to arrange the mirror 19, which provides a further turning of the measurement path 9, as a semi-reflective mirror and to provide observation apparatus in connection therewith if the camera 18 does not include suitable observation facilities. As shown in FIG. 5a, the main beam splitter 7 may be mounted on a slide 20 which additionally is provided with an aperture 7a and a fully reflective opaque mirror 7b. It is then possible by adjustment of the position of the slide 20 to direct all of the light through aperture 7a into the photographic apparatus or part into the photographic apparatus and part into the photometric apparatus using the main beam splitter 7 or all of the light into the photometric apparatus by means of the fully reflective mirror 7b.

While I have shown and described what I believe to be the best embodiments of my invention, it will be apparent to those skilled in the art that various changes and modifications may be made therein without departing from the spirit and scope of the invention as defined in the appended claims.

What is claimed is:

1. Microscope apparatus of the class described, comprising: microscope means defining a main optical path for microscopic examination of an object; main beam splitting means dividing said main path into an observation path and a measurement path, one of which is angularly displaced from said main path; adjustable means defining a restrictive aperture the area of which may be varied, said aperture being located in said measurement path, said beam splitting means causing an image of said aperture to be formed in said observation path; ocular observation means for simultaneously observing the images of said object and of said aperture, said image of said aperture being positioned to indicate that portion of said object from which the illumination will be measured; lighting means for illuminating said aperture to permit observation thereof; and photometric means positioned in said measurement path to receive and measure the intensity of light from said main path after passage of said light through said aperture.

2. Microscope apparatus according to claim 1, wherein said lighting means comprises further beam splitting means disposed in said measurement path, said lighting means including a light source laterally displaced from said measurement path and positioned to cause light therefrom to be reflected by said further beam splitting means and through said aperture to said main beam splitting means.

3. Microscope apparatus according to claim 1, wherein said lighting means includes a light source laterally displaced from said measurement path and diverting means located in said measurement path between said aperture and said photometric means, said diverting means receiving light from said light source and directing said light along said measurement path toward said aperture.

4. Microscope apparatus according to claim 3, in which said diverting means comprises a displaceable opaque mirror which may be selectively inserted in or withdrawn from said measurement path.

5. Microscope apparatus according to claim 3, in which said diverting means comprises a partially opaque reflective surface.

6. Apparatus according to claim 1, wherein said main beam splitting means is chromatically responsive for acting selectively on light beams of different chromaticities, whereby with said object illuminated with light of a first chromaticity and said aperture illuminated by light of second chromaticity, said photometric means is operative independently of the illumination of said aperture by said lighting means, said first and second chromaticities being separable by said main beam splitting means.

7. Microscope apparatus according to claim 1, further comprising mirror means providing a reflective surface laterally spaced from said main path and positioned to receive reflected light from said main beam splitting means and to reflect said light into said observation path and toward said ocular means which would otherwise be reflected away from said ocular means by said main beam splitting means.

8. Microscope apparatus according to claim 7, wherein said main beam splitting means is located in a portion of said main path where the light rays are parallel and in which said reflective surface is flat.

9. Microscope apparatus according to claim 7, wherein said main beam splitting means is located in a portion of said main path where said rays are convergent away from said object and in which said reflective surface is concavely curved.

10. Microscope apparatus of the class described, comprising: microscope means defining a main optical path for microscopic examination of an object; main beam splitting means dividing said main path into an observation path and a measurement path, one of said last-named paths being angularly displaced from said main path, said observation path having a first focal plane and said measurement path having a second focal plane; adjustable stop means defining a restrictive aperture the area of which may be varied at will, said aperture being positioned at said second focal plane, said beam splitting means causing an image of said aperture to be formed at said first focal plane; photographic camera means having its photosensitive member located at said first focal plane; lighting means for illuminating said aperture from the side thereof remote from said beam splitting means; and photometric means positioned to receive and measure the intensity of light from said main path after passage through said aperture.

11. Microscope apparatus according to claim 10, wherein said first and second planes are mutually perpendicular, said apparatus further comprising: a displaceable slide member, said main beam splitting means being mounted on said slide member; mirror means carried by said slide member, said mirror means being positionable in said main path by movement of said slide member for reflecting all of the light in said main path perpendicularly away therefrom toward one of said planes, said slide member having an opening formed therein, said opening being positionable in said main path by movement of said slide member for permitting all of the light in said main path to proceed freely to the other of said planes.

References Cited

UNITED STATES PATENTS

| 2,392,978 | 1/1946 | Dimmick | 350—166 X |
| 2,422,376 | 6/1947 | Turner et al. | 350—91 |
| 2,423,370 | 7/1947 | Butscher | 350—86 X |
| 2,659,268 | 11/1953 | Grand | 350—18 |
| 3,218,908 | 11/1965 | Armington | 350—174 |

FOREIGN PATENTS 877,336   9/1961   Great Britain.

DAVID SCHONBERG, Primary Examiner.

PAUL R. MILLER, Assistant Examiner.

U.S. Cl. X.R.

88—23; 350—169, 91, 31, 30, 17